Nov. 22, 1949     C. B. BUDD ET AL     2,488,761
CORD FLEXING MACHINE
Filed Sept. 12, 1946     2 Sheets-Sheet 1
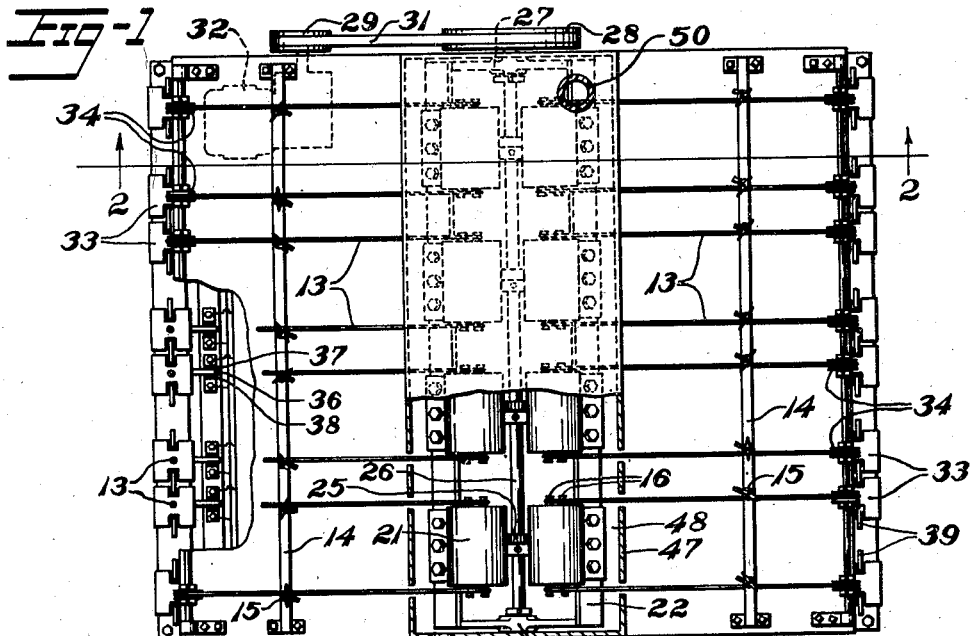
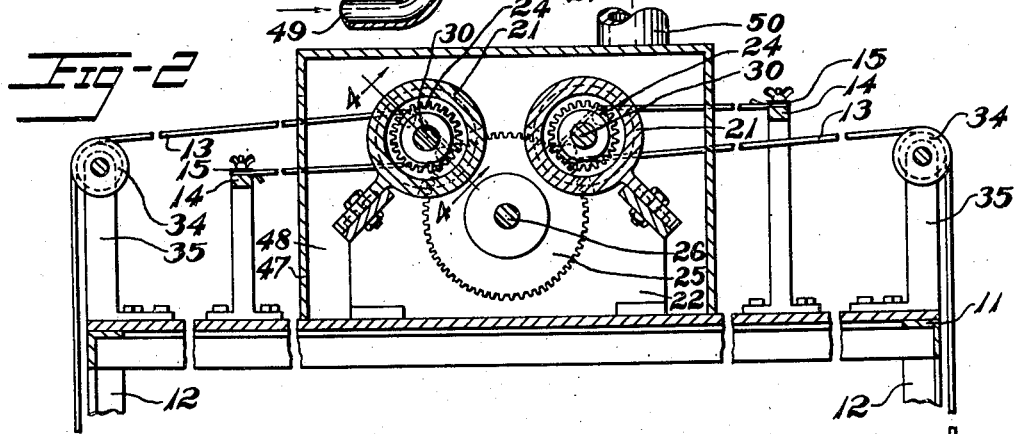
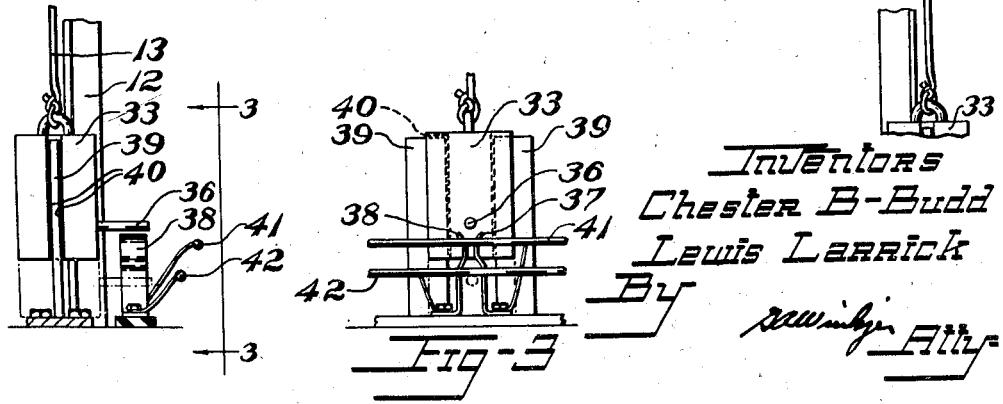
Inventors
Chester B. Budd
Lewis Larrick

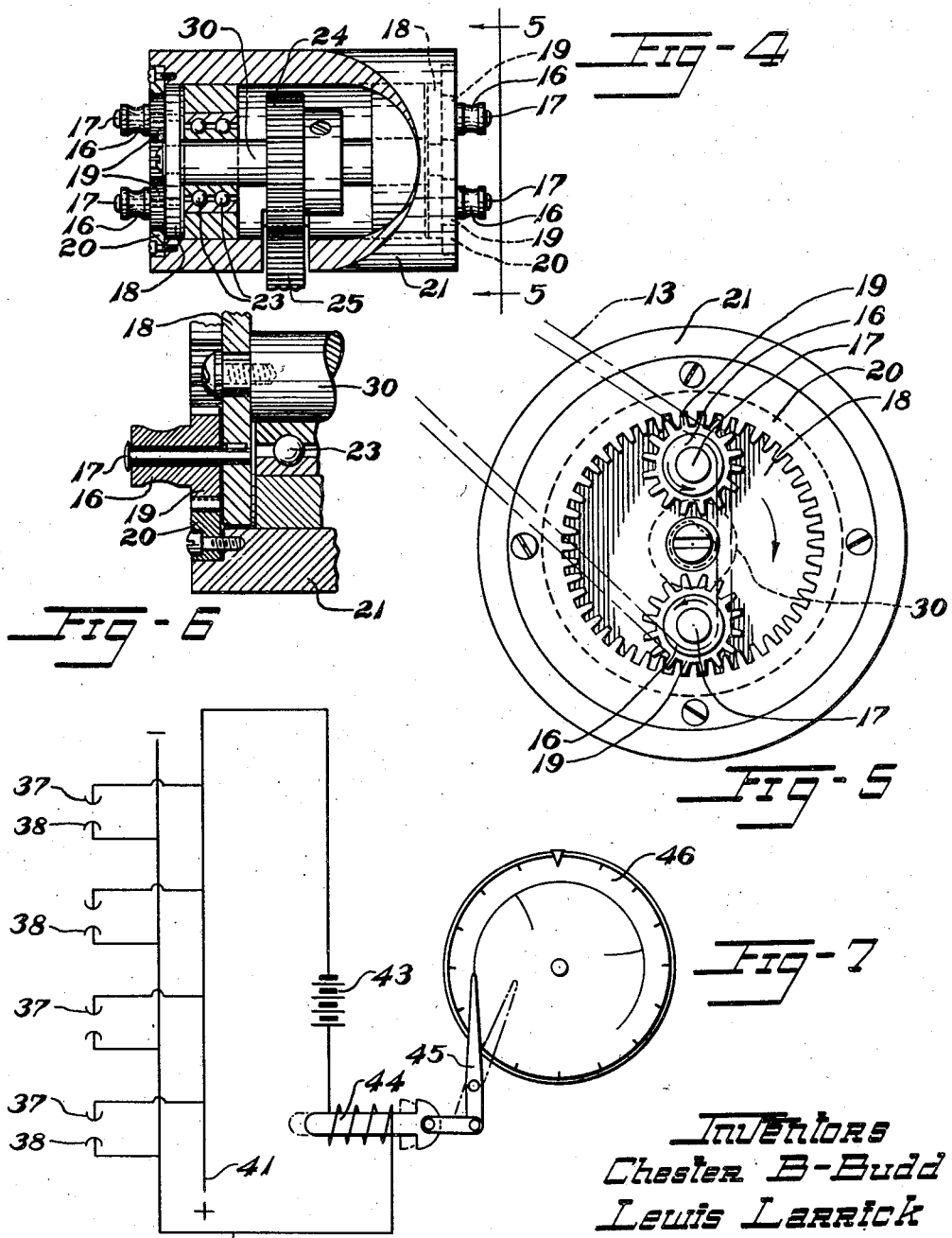

Patented Nov. 22, 1949

2,488,761

UNITED STATES PATENT OFFICE 2,488,761

CORD FLEXING MACHINE

Chester B. Budd, Akron, Ohio, and Lewis Larrick, Charlottesville, Va., assignors to The B. F. Goodrich Company, New York, N. Y., a corporation of New York Application September 12, 1946, Serial No. 696,522

10 Claims. (Cl. 73—100)

This invention relates to testing of filamentary or other articles in flexible strip form, such as cords, threads and the like, and especially to apparatus for testing the resistance of such articles to the effects of cyclic bending stresses.

This invention is an improvement in testing apparatus of the kind shown and described in the Edward T. Lessig Patent 2,291,086, issued July 28, 1942, and entitled "Apparatus for testing filamentary or strip articles." In the prior patent a plurality of cords to be tested are looped around rollers which are turned on their individual axes by the action of the cords as the rollers are rotated mechanically as a group. The plurality of cords lie against each roller in side-by-side relationship, longitudinally of the roller and extend transversely from the rollers.

It is a desirable feature of testing apparatus that one cord may be subjected to the same conditions as another cord tested on the same apparatus so that the properties of one may be reliably compared with the properties of the other. In the use of the apparatus of the prior patent, it was sometimes found difficult to compare the properties of the cords as the results in some cases were erratic and inconsistent. The discrepancies which appeared in the results are attributed to the variable turning and the bending of the long rollers. Rotation of the rollers in the prior patent is dependent upon friction between the cords and the rollers, and upon the efficiency of the anti-friction bearing, both variable factors. Bending of the rollers takes place because of the length-diameter ratio of the rollers used in the prior patent for the desired cyclic bending, which includes a small diameter for sharp bending, and a relatively long roller to test a large number of cords simultaneously. The bending of the rollers leads to unequal testing conditions for the cords tested simultaneously, and is another reason erratic results have been experienced.

Objects of this invention are to provide for elimination of the undesirable features of the apparatus of the patent referred to heretofore while retaining inherent advantages, to provide a high degree of uniformity and accuracy in test results measuring the properties resisting stresses caused by cyclic bending; to provide an arrangement making possible an individual bending roller for each article, to provide means for rotating each bending roller other than by the action of the article; to provide for testing of filamentary or strip articles subjected to cyclic bending stresses without objectional slip between the articles and the rollers, and to provide apparatus for obtaining uniformly accurate and reliable test results of the bending fatigue of such articles.

These and further objects will be apparent from the following description, reference being had to the accompanying drawings in which:

Fig. 1 is a plan view of apparatus constructed in accordance with and embodying the invention, parts being broken away and sectioned.

Fig. 2 is a section taken along the line 2—2 of Fig.1, parts being broken away.

Fig. 3 is a view taken along the line 3—3 of Fig. 2.

Fig. 4 is a section taken along line 4—4 of Fig. 2.

Fig. 5 is a view taken along the line 5—5 of Fig. 4.

Fig. 6 is a detailed section of the roller mounting shown in Fig. 5, parts being broken away.

Fig. 7 is a schematic view of the recording apparatus.

Apparatus constructed in accordance with and embodying the invention may be mounted on a table comprising a structure 11 supported by legs 12. A plurality of filamentary or strip articles to be tested such as cords 13, 13 are secured as by means of individual plate clamps 15 to supporting members 14, 14 mounted on the structure 11. The plate clamps 15, 15 may be raised and lowered to engage and disengage cords 13, 13 by means of thumb screws. Although this clamping means is preferred, any other suitable retaining means may be used if desired.

Each cord 13, 13 extends from the supporting members 14, 14 about a pair of smooth-surfaced rollers 16, 16, which rotate about individual axes and also about a common axis intermediate the rollers 16, 16. Each roller rotates about a stud 17, 17, which is non-rotatably mounted on a rotatable disc member 18, 18. Also rotating about the stud 17, 17 and integral with the roller 16 is a planetary pinion 19, 19 meshing with an internal gear 20, 20. The gear 20 is mounted in a sleeve structure 21 secured to a supporting structure 22, which is mounted on the table structure 11. The disc members 18 are mounted on a shaft 30, which is supported rotatably by ball bearings 23 which are mounted in the sleeve section 21. On each shaft 30 is mounted a gear 24 which meshes with a driving gear 25, 25. The driving gears are mounted on a line shaft 26 rotatably supported by anti-friction bearings 27, which are mounted in the supporting structure 22. The driven pulley 28 is mounted on the line shaft 26, and connected to a driving pulley 29 by a belt 31. The driving pulley 29 is turned by any suitable source of power such as a motor and variable speed unit 32 shown in dotted lines in Fig. 1.

Weights 33 attached to the free ends of the cords 13, 13 subject the cords to tensile stresses. The cords may be passed over pulleys 34 intermediate the weights 33 and the rollers 16 as in Fig. 1, or the weights 33 may hang directly from the rollers 16. If the pulleys 34 are used they may be mounted on brackets 35, which are mounted on the table structure 11.

A recording apparatus is incorporated in the invention to automatically record breaking of the cords 13 during a test. A pin 36 is mounted on each weight 33 and disposed so that when the cord 13 breaks, the pin 36 will connect the current conducting spring members 37, 38 as it passes between them. Guiding fork members 39 fit in slots 40 in the weights 33 and confine the weights so that the pins 36 will pass between the spring members 37, 38. A recording circuit as shown in Fig. 7 may be used in which each spring member 37 is connected to a positively charged lead 41 and the other spring members 38 are connected to a negatively charged lead 42. An electrical power source 43 is connected to the leads 41 and 42 and a solenoid 44 is interposed in the circuit to actuate an indicator arm 45 for marking the indicating clock card 46.

The cord manipulating mechanism may be enclosed in a box-like structure 47 mounted on the table structure 11 to form a heating chamber 48, whereby the cord 13 may be flexed under any desired temperature and humidity. Air or other gases at the temperature and humidity desired may be conducted into the chamber 48 through a conduit 49 and conducted from the chamber 48 by a conduit 50. Suitable apertures in the sides of the structure 47 permit passage of the articles being tested therethrough.

The apparatus of the invention is adapted to receive a large number of test specimens simultaneously. Sixteen cords are mounted on the apparatus shown in the drawings, although this number may be varied as desired, and apparatus embodying the invention may be similarly constructed to test the desired number of cords simultaneously. Provision for a large number of cords makes possible substantial savings of time in testing filamentary articles and makes for convenience in making comparative tests.

In operation cords 13 to be tested are clamped to supporting members 14 and passed over rollers 16 and pulleys 35, and tied to weights 33 such that the pin 36 is above the spring members 37, 38. In looping the cord about the rollers, it is preferred simply to bend the cord to present approaching and departing reaches generally parallel, as shown in the drawings, each cord passing partially around each roller.

The motor and variable speed unit 32 and the clock card 46 may then be started simultaneously at the desired speed. The motor and variable speed unit 32 will turn the driving pulley 29, which will turn the driven pulley 28 and the line shaft 26. The driving gears 25 mounted on the line shaft 26 will then turn the gears 24 and the shafts 22 and the discs 18. Each disc as viewed in Figs. 2 and 5 rotates in a clockwise direction carrying the stud 17 in a clock-wise direction. The pinions 19, which are rotatably mounted on the stud 17 will then be caused to rotate in a counter-clockwise direction about the stud 17 by the action of the internal gear 20, 20, which is prevented from turning as it is fixedly mounted in the sleeve structure 21. The roll 16 will turn with the pinion 19, and bend the cords 13 by changing the loops.

The sharpness of bending of the cord may be increased by reducing the diameter of the roll since the curvature of the rollers for a given arrangement determines the arc of bending. The lower portion of the cords shown in dotted line in Fig. 5 is the portion preferably secured to the support. The discs may be turned either way, but it is preferred that the discs turn toward the portion of the cords secured to the support 14 and away from the portion of the cord 13 secured to the weight 33. As the rolls 16 are turned, they roll on the cords with a minimum of friction. Such friction as may be present is substantially constant among the cords so that the results are not objectionably affected.

As the rollers 16, 16 rotate, each cord will be flexed until it reaches the fatigue limit in bending. When a cord breaks, the weight 33 hanging on the cord will be released and fall, causing the pin 36 to make contact between the spring members 37, 38 and connect the positive lead 41 with the negative lead 42. The resulting current will actuate the plunger of the solenoid 44 as seen in Fig. 7 and move the indicator arm 45 to the position shown by dotted line in Fig. 7, causing a mark to be made on the clock card indicating the time at which one cord 13 broke. The indicator arm will return to the normal position immediately as the pin 36 makes contact between the spring members 37, 38 only for an instant as the weight 33 falls. The indicator arm will mark the time of breakage of each cord as hereinbefore described for one cord.

Variations may be made without departing from the invention as it is defined in the following claims.

We claim:

1. Apparatus for imposing cyclic bending stresses on a flexible filamentary or strip article substantially without rubbing action on the article for the purpose of testing the resistance of the article to bending fatigue, said apparatus comprising a supporting structure, a set of rollers, means for mounting said rollers for individual rotation about spaced-apart axes and for receiving a loop of the article about said rollers, means for rotating said mounting means and rollers as a group about an axis intermediate said spaced-apart axes and means comprising elements carried by said mounting means and moveable along an adjacent surface of said supporting structure with said elements in engaging relation with said adjacent surface for effecting drive of said rollers about their own axes at a uniform speed of rotation under uniform speed of rotation of said mounting means relative to said supporting structure.

2. Apparatus for imposing cyclic bending stresses on a flexible, filamentary or strip article substantially without rubbing action on the article for the purpose of testing the resistance of the article to bending fatigue, said apparatus comprising a supporting structure, a mounting element mounted rotatably on said structure, a set of rollers rotatable about spaced-apart axes mounted on said mounting element for receiving a loop of the article about said rollers, driving gear means interposed between said rollers and said element for positively driving said rollers individually in rotation about said axes, and means for rotating said element and rollers as a group about an axis intermediate said spaced-apart axes to flex the looped portion of the article.

3. Apparatus for imposing cyclic bending stresses on a flexible filamentary or strip article substantially without rubbing action on the article for the purpose of testing the resistance of the articles to bending fatigue, said apparatus comprising a supporting structure, an element mounted rotatably on said structure, a set of rollers rotatable about spaced-apart axes mounted on said element for receiving a loop of the article about said rollers, a gear driving member interposed between said rollers and said structure and geared to said rollers for positively driving said rollers individually in rotation about said axes, and means for rotating said element and rollers as a group about an axis intermediate said spaced-apart axes to flex the looped portion of the article.

4. Apparatus for imposing cyclic bending stresses on flexible, filamentary or strip articles substantially without rubbing action on the articles for the purpose of testing the resistance of the articles to bending fatigue, said apparatus comprising a flexing unit comprising a supporting structure, a shaft body mounted rotatably in said structure, sets of geared rollers mounted on opposite ends of said body and rotatable about spaced-apart axes for receiving loops of the articles about each set of rollers, ring gear means interposed between said structure and said rollers for positively driving said rollers individually in rotation about said axes through meshing of the gears of said rollers with said ring gear means and means disposed between said opposite ends for rotating said shaft relative to said structure and the sets of rollers about an axis intermediate said spaced-apart axes for flexing the material of said loop.

5. Apparatus for imposing cyclic bending stresses on a flexible filamentary or strip article substantially without rubbing action on the article for the purpose of testing the resistance of the article to bending fatigue, said apparatus comprising a supporting structure, a driving element mounted on said supporting structure for rotation about an axis, said driving element having an end face, a set of rollers mounted on said end face for individual rotation about spaced-apart axes and for rotation as a group about the axis of said driving element, said set of rollers being arranged for receiving a loop of the article about the same, and means comprising elements carried by said end face and moveable along an adjacent surface of said supporting structure with said elements in engaging relation with said adjacent surface for effecting drive of said rollers about their own axes at a uniform speed of rotation under uniform speed of rotation of said driving element relative to said supporting structure.

6. Apparatus for imposing cyclic bending stresses on a flexible filamentary or strip article substantially without rubbing action on the article for the purpose of testing the resistance of the article to bending fatigue, said apparatus comprising a supporting structure, a driving element mounted on said supporting structure for rotation about an axis, said driving element having an end face, a set of rollers mounted on said end face for individual rotation about spaced-apart axes and for rotation as a group about the axis of said driving element, said set of rollers being arranged for receiving a loop of the article about the same, and means comprising elements carried by said end face and having a geared connection with adjacent portions of said supporting structure for effecting drive of said rollers about their own axes upon relative rotation of said driving element and said supporting structure.

7. Apparatus for imposing cyclic bending stresses on a flexible filamentary or strip article substantially without rubbing action on the article for the purpose of testing the resistance of the article to bending fatigue, said apparatus comprising a supporting structure, a driving body mounted on said supporting structure for rotation about an axis, sets of rollers mounted on opposite ends of said body and the rollers of each set being rotatable about spaced-apart axes for receiving loops of the article about the sets of rollers, means interposed between said sets of rollers for effecting drive of said rollers upon relative rotation of said driving body and said supporting structure and means interposed between said opposite ends of said driving body for effecting rotation of the latter relative to said supporting structure for flexing the material of said loops.

8. Apparatus for imposing cyclic bending stresses on a flexible filamentary or strip article substantially without rubbing action on the article for the purpose of testing the resistance of the article to bending fatigue, said apparatus comprising a supporting structure, a body rotatably mounted on said supporting structure, a set of rollers mounted on said body for rotation therewith and also for rotation relative to said body about individual axes, said rollers being adapted to receive a loop of the article about the same and means comprising elements carried by said body and moveable along an adjacent surface of said supporting structure with said elements in engaging relation with said adjacent surface for effecting drive of said rollers about their own axes at a uniform speed of rotation under uniform speed of rotation of said body relative to said supporting structure.

9. Apparatus for imposing cyclic bending stresses on a flexible filamentary or strip article substantially without rubbing action on the article for the purpose of testing the resistance of the article to bending fatigue, said apparatus comprising a supporting structure, an internal gear mounted on said supporting structure, a rotatable body mounted on said supporting structure for rotation about the axis of said internal gear, a set of pinion gears mounted rotatably on said body in meshing engagement with said internal gear and a set of article-engaging elements mounted on said pinions for flexing a loop of the article about the set of elements upon relative rotation of said body and ring gear.

10. Apparatus for imposing cyclic bending stresses on flexible filamentary or strip articles simultaneously, substantially without rubbing action on the articles for the purpose of testing the resistance of the articles to bending fatigue, said apparatus comprising a supporting structure, a plurality of flexing units mounted on said structure, each of said flexing units comprising a shaft mounted rotatably in said structure, sets of rollers having gears mounted on opposite ends of said shaft and rotatable individually about spaced-apart axes for receiving loops of the articles about the sets of rollers, means to present approaching reaches of the articles to said rollers, means for directing departing reaches of the articles from said rollers in the directions from which the approaching reaches of the articles extend and substantially parallel to the approaching reaches, geared driving members mounted on said structure and meshing with said gears of said rollers for positively driving said rollers individually in rotation about said axes, and means extending along said units and engaging each shaft between said opposite ends thereof for driving the shafts together in rotation about axes intermediate said spaced-apart axes to flex the loops, and breakage recording means comprising a solenoid, a marking arm mounted for movement in response to movement of said solenoid, a time indicating dial cooperating with said arm and means for actuating said solenoid in response to breaking of the articles.

CHESTER B. BUDD.
LEWIS LARRICK.

REFERENCES CITED

The following references are of record in the file of this patent:

UNITED STATES PATENTS

| Number | Name | Date |
|---|---|---|
| 471,337 | Humphreys | Mar. 22, 1892 |
| 889,993 | Vaughan et al. | June 9, 1908 |
| 1,347,291 | Price | July 20, 1920 |
| 1,749,297 | Norman | Mar. 4, 1930 |
| 1,785,690 | Buffum | Dec. 16, 1930 |
| 2,291,086 | Lessig | July 28, 1942 |